United States Patent
Camus et al.

(10) Patent No.: US 6,173,230 B1
(45) Date of Patent: Jan. 9, 2001

(54) DATA LINK SYSTEM BETWEEN AN AIRCRAFT AND THE GROUND AND PROCEDURE FOR RECOVERING FROM A FAILURE

(75) Inventors: Paul Camus, Blagnac; Jérôme Rascol, Plaisance du Teuch, both of (FR)

(73) Assignee: Aerospatiale Societe Nationale Industrielle, Paris Cedex (FR)

( * ) Notice: Under 35 U.S.C. 154(b), the term of this patent shall be extended for 0 days.

(21) Appl. No.: 09/055,267

(22) Filed: Apr. 6, 1998

(30) Foreign Application Priority Data

Apr. 10, 1997 (FR) .................................................. 97 04417

(51) Int. Cl.$^7$ ........................................................ G06F 19/00
(52) U.S. Cl. ............................ 701/120; 701/24; 701/36; 244/75 R
(58) Field of Search ..................................... 701/3, 11, 14, 701/24, 36, 117, 120, 33; 340/945, 947, 948; 244/75 R, 158 R

(56) References Cited

U.S. PATENT DOCUMENTS

| | | | |
|---|---|---|---|
| 4,104,512 | * | 8/1978 | Strayer ................................. 701/120 |
| 4,744,532 | * | 5/1988 | Ziegler et al. ....................... 244/75 R |
| 5,025,382 | * | 6/1991 | Artz ...................................... 701/120 |
| 5,381,140 | * | 1/1995 | Kuroda et al. ....................... 701/120 |
| 5,408,462 | | 4/1995 | Opoczynski . |
| 5,502,812 | | 3/1996 | Leyre et al. . |
| 5,627,546 | * | 5/1997 | Crow .................................... 701/120 |
| 5,659,475 | * | 8/1997 | Brown .................................. 701/120 |
| 5,677,841 | * | 10/1997 | Shiomi et al. ....................... 701/120 |
| 5,714,948 | * | 2/1998 | Farmakis et al. .................... 701/120 |

FOREIGN PATENT DOCUMENTS 0 535 761   2/1992 (EP) .

* cited by examiner

*Primary Examiner*—William A. Cuchlinski, Jr.
*Assistant Examiner*—Gertrude Arthur
(74) *Attorney, Agent, or Firm*—Burns Doane Swecker & Mathis L.L.P.

(57) ABSTRACT

The present invention relates to a data link system between an aircraft and at least one ground station comprising an on-board assembly, a ground-air assembly, a land-based assembly, the last two assemblies being composed of sub-networks interconnected by routers and acting as the medium for distributed applications, the on-board assembly comprising a first (10) and a second (11) application computer. These two computers (10, 11) are distinct and interchangeable and receive both the same data supplied by the on-board user interface (12) and the same data supplied by an interface (13) with the ground-air sub-network access processor or processors (14) on the ground user side.

2 Claims, 3 Drawing Sheets

DATA LINK SYSTEM BETWEEN AN AIRCRAFT AND THE GROUND AND PROCEDURE FOR RECOVERING FROM A FAILURE

TECHNICAL FIELD

The present invention relates to a data link system between an aircraft and at least one land-based station and a procedure for surviving failure of the application computer on board the aircraft in order to maintain an operational link.

BACKGROUND ART

The authorities responsible for controlling air traffic have decided to supplement standard voice communication systems with digital communications means in order to maintain the high safety levels required in the light of recent increases in air traffic.

The International Civil Aviation Organization (ICAO) is developing and installing a global telecommunications network called ATN for this purpose and applying OSI standards.

The performance requirements of the data link system increase in areas of high traffic and uptime performances become a major objective.

THE ACARS NETWORK

Airline companies now use a digital system for communicating between aircraft and their operations centers. This system, called ACARS (Aircraft Communication and Reporting System), is described in references [1] and [2] listed at the end of the present description. The system is used to exchange messages concerning aerial operations as well as administrative messages.

The majority of recent aircraft are equipped with the ACARS system, which has now been use for some fifteen years. It is particularly useful to airline companies for real-time management of their fleets, carrying out maintenance, operational control and performance optimization operations. Most Air Traffic Control (ATC) communications nowadays use VHF and HF voice links.

The efficiency of the ACARS system over the last decade has led the aviation authorities to extend its use into Air Traffic Control. Use of this resource to complement standard voice communication links will maintain the high safety standards imposed by the current increase in air traffic.

The US Federal Aviation Administration (FAA) has already started introducing this data link system in the South Pacific region where air traffic is less dense. This is a prelude to the widespread application of the "Future Air Navigation System" (FANS) which combines new Communication, Navigation and Surveillance (CNS) resources.

Performance requirements vary according to the type of traffic area under consideration; these areas are divided into oceanic, domestic, terminal and airport areas. Requirements are at their most severe in terminal areas where the traffic is at its densest as aircraft come in to land. Performances are defined in terms of integrity, uptime, and system transmission times.

Air Traffic Network (ATN)

The performance objectives associated with the interoperability objectives of distributed applications have led the ICAO to define a global Air Traffic Network (ATN) that is more compatible with the ACARS system. The ATN is described in document reference [3] listed at the end of this description. The improvements relate to adapting ISO standard protocols to ground-air networks by replacing character-oriented message formats with bit-oriented formats. These protocols are suitable for Open System Interconnection data exchange (OSI).

Data links enable ground-based and on-board computers belonging to a variety of independent bodies such as aviation authorities and airline companies to dialog. These computers are supplied by a wide variety of producers and are often of different generations. Faced with this situation, a set of standardized communication protocols is defined and then installed, validated and tested on each system to be used for data communication in order to make dialog between computers of different origin possible.

The choice of communication means must be transparent to the application. In practice, S mode, Satellite, VHF, HF and gate-link data links are not all available in every area an aircraft may be located. In order, therefore, to ensure continuity of service, the on-board ATC applications need to make a transparent change to the type of data link used during the flight.

If these conditions are complied with it is possible to interconnected on-board or ground-based computers so that they communicate with one another irrespective of the type of communication system used (VHF, HF, satellite, cable, etc.) and without having to write dedicated adaptation programs. This is the Air Traffic Network (ATN) concept, based on the interoperability of different types of sub-network. The architecture and protocols of ATN comply with the Open Systems Interconnection (OSI) reference model issued by the ISO. This model is used as a working framework for defining the services and protocols used in the ATN.

The ATN is defined as an interconnection of data networks capable of providing a common communication service to meet the needs of air traffic control (ATSC) and the airline companies (AISC). This interconnection may include and use existing networks and infrastructures whenever possible. The service proposed must meet the operating safety and access security demands required by the air traffic control and airline company applications as well as offering various levels of service.

The OSI architecture puts the responsibility for routing onto computers known as Routers, thereby freeing the end systems from performing this function. This allows the end systems to remain relatively simple. An ATN user system, which may range from a complete ATC system to a simple personal computer, accesses the network services via an access point. A user first accesses the ATN via a sub-network such as an Ethernet network or X25 public network such as Transpac, which accesses an ATN router that is a subscriber of the sub-network. The user system is directly connected to the access sub-network via a physical connector and by using this sub-network it communicates with the ATN router. It accesses the ATN services via the ATN router. The user system must therefore include the hardware and software needed to use the access sub-network. It must also supply the Connectionless Network Protocol (CLNP) and the ES-IS routing data transfer protocol between the end systems (ES) and the routers (IS), the CLNP being a simple protocol supporting the exchange of messages known as datagrams between a transmitting entity and a receiving entity; the ES-IS protocol enables users and access routers to identify one another.

Like all networks, the ATN can never attain a 100% delivery probability; its performance can, however, come near this figure by eliminating the use of low-reliability sub-networks, by increasing the router commutation capacity and sub-network transmission, and due to the redundancy included in the architecture of the systems.

Open System Interconnection (OSI)
Communication Model

The OSI model divides the data communication process into seven levels of service. Each level of service (or layer) uses the level directly below it to provide a more abstract service level. This type of architecture has the advantage of hiding the underlying structure of the communication system, which makes it possible to use the same interface accessing telecommunications services for very different transmission systems. An ATC system can therefore be developed and operated irrespective of the type of telecommunications system used. Two similar ES (End System) computers supporting the distributed application (one on-board and one on the ground) are installed at each end of the data communication system. A certain number of intermediate hidden computers are located between these two systems; their task is to route and relay data passing through the network. A representative (or entity) of each level of service is present in each of these computers. The ES computers contain at least the first four levels of service described below, while the intermediate computers only include the first three. The protocol of a given level enables two remote entities to exchange data concerning the service provided by that level.

Every transmission system includes physical transmission mediums that transmit binary data from one computer to another. The physical mediums may be of a wide variety of types: electric cables for 429 buses, radio links for HF, VHF and satellite communications, optical fibers for FFDI on-board communications (OLAN) and infrared for gate links.

The seven layers are divided as follows: communications-oriented lower layers (1 to 3)

Physical layer 1 (bit level) is used to conduct binary data or bits to their destination on the physical medium. It includes the connection interfaces of the IT equipment (junctions) and modems. Transfer of binary data to a physical medium may pose problems of continuity of service due to outside disturbances; the physical layer is characterized by a binary error rate (BER) that indicates the average number of erroneous bits per transmitted bit.

The link layer (layer 2) (frame level) uses retransmission to correct errors that have been generated at level 1 so that the residual error rate is improved. Rather than operating at bit level, this layer functions at bit frame level using cyclic redundancy checks (CRC). The layer uses rules such as addressing and medium access policy for dividing up the physical medium common to several subscribers.

The network level (level 3) (packet level) operates in a more complex communication structure found in packet switched data networks (PSDN) such as Transpac or the SITA MTN network. These networks consist of communication nodes connected by a link level service, forming a mesh that covers a geographical area. This structure has the chief advantage of offering a number of different paths to a given subscriber. The messages that subscribers to the network exchange constitute a packet. The network layer must therefore ensure that data packets are correctly routed via intermediate nodes to reach the final user. This layer has three main functions: addressing, routing and flow control. Each subscriber has its own address on the network. It is at this level that two different approaches to routing the packets are found: connected mode or unconnected (datagram) mode.

In connected mode the transmitting subscriber must first contact the addressee in order to agree on the conventions that will govern the exchange. The addresses of message transmitters and addressees are associated so that the network level identifies what is referred to as a virtual circuit. The packets flow in a given order to arrive in the same order they were transmitted. The virtual circuit is associated with a path through the network (i.e. a list of nodes) that is followed by the call packet. Each node involved in the virtual circuit mobilizes resources (memories, etc.) to carry the packet traffic. It also contains information about the next node in the circuit; this means that data packets only require very limited data concerning their origin and their destination. The circuit is described as virtual because it operates like a circuit, even though it does not have a physical medium.

In unconnected mode the transmitting subscriber transmits a packet without having to take the requirements of the addressee into consideration. It uses the datagram method in which each packet is considered to be independent of the other packets. In this case, the packets may take different paths and arrive in any order, or indeed not arrive at all, at the addressee. A fundamental difference from connected mode is that in a datagram the addressee's full network address must be given since no information about the nodes is given to effect routing of a packet.

These two modes are present at every level of the OSI model. However, the ICAO chose to include an unconnected service in the network level of the ATN.

The ground-air sub-networks are extensions of terrestrial packet switching networks (X25) for moving aerial subscribers. They offer a sub-network in connected mode. Thus in the AIRCOM satellite sub-network created by the consortium made up of SITA, France Telecom, OTC Limited (Australia) and Teleglobe Canada it is possible to establish a virtual circuit between an aircraft flying over the Atlantic and a terrestrial Transpac subscriber.

An intermediate layer

The transport layer (layer 4) is the final layer concerned in routing data. It completes what has already been achieved by the previous layers. It should provide the user a satisfactory quality of service. The various types of service found in this layer range from simple formatting/deformatting of data for addressing users of the transport service to complex functions including error correction and monitoring the communications between the two user ends of the transport service in connected mode.

Application oriented upper layers 5 to 7

Although not directly involved in communication itself, the session (5), presentation (6) and application (7) layers are part of the network architecture. As its name suggests, the session layer is used to open and close sessions between users. The presentation layer is responsible for the syntax of data transferred between service users. It provides a common syntactical language to all the connected users. The application layer gives the user program the means to access the OSI environment. These three layers provide a very large number of services, very few of which are of any use for the basic requirements of aeronautical communications. On the other hand, these service layers have no influence on the general on-board architecture or communications security.

A layer may itself be divided into sub-layers. Moreover not all layers and sub-layers are necessarily included in a system.

In a complex communication architecture such as that of an aeronautical network, the end systems exchange data via several sub-networks interconnected by means of routers. In this type of architecture neither the access interface nor the internal operation of the sub-networks is controlled any more than the type and quality of service provided.

According to the ISO-OSI breakdown into layers, all functions related to routing data through these interconnected sub-networks are the province of the network layer (layer 3).

This layer is subdivided into three sub-layers:
  a lower sub-layer that fulfills the SubNetwork Access Protocol (SNACP) function; this layer constitutes the access interface at packet level to a specific sub-network on which it is totally dependent. It thus provides the specific service of this sub-network,
  an intermediate sub-layer that fulfills the SubNetwork Dependent Convergent Protocol (SNDCP) function; it adapts the SNACP and SNICP layers to one another by bringing the service provided by SNACP up to the level required by SNICP,
  an upper sub-layer that fulfills the SubNetwork Independent Convergence Protocol (SNICP) function; it supplies the user with the ISO-OSI service while masking the variety of sub-networks used.

These three sub-layers co-operate to provide the ISO-OSI network service.

On-Board Data Link System

An on-board data link system comprises an assembly that corresponds to the system installed on the vehicle (aircraft etc.), a ground-air assembly and a land-based assembly. These assemblies are composed of sub-networks interconnected by routers and act as the mediums for distributed applications.

In the context of the ATN communication network the applications are tasks that call upon communication services.

The on-board data link model is progressively installed taking the operational environment into consideration.

Communication Context

The vehicle on which the on-board data link system is installed moves in relation to the terrestrial network. Consequently data regarding the communication environment changes during the journey in ways that are not always possible to predict. The data may not therefore be obtained in advance and must be acquired during dynamic exchanges and updates depending on the connectivity at any given moment.

Communication services are available in the stacked layers used by the OSI model. Each layer corresponds to a communication level that has its own protocols.

To ensure context management the entities at each level must successively identify the radio stations within range, the adjacent routers and their addresses on sub-networks, the ATN addresses of end systems containing distributed applications, the optimized routes passing through the various routing fields, together with the name and address of the applications in the end systems.

Status machines

The behavior and interactions between remote entities are defined by protocols. Protocols are rules for the real-time exchange of data between systems that are open, interactive and distributed on the network.

A protocol is given physical form using a status machine or programmable controller that can adopt a finite number of statuses. Its behavior fully defines the functions of an entity: the status of its connections, events, actions and resulting status.

Uptime Performance

The uptime of an on-board data link service is defined as the probability of the function that the service is expected to achieve ceasing to be available during use.

This uptime objective is essential when the on-board data link service is used for exchanging messages that are critical in safety terms.

The aim of the invention is to use a data link system to ensure the continuity of digital communications between an aircraft and the ground when a failure occurs in the on-board application computer. It does this by using mechanisms that ensure that applications survive a failure without delay or operational impact.

The document given as reference [4] at the end of this description is an extract from a recent ARINC document shows that the problem of transfer at the moment of failure has not, to date, been solved by international experts. The document presents an approach based on exchanges between application computers that are fundamentally different from the survival mechanisms of the invention.

DISCLOSURE OF THE INVENTION

The present invention relates to a data link system between an aircraft and at least one land-based station comprising an on-board assembly, a ground-air assembly and a land-based assembly, the last two assemblies being composed of sub-networks interconnected by routers and acting as the medium for distributed applications, said applications being tasks that use communication services, the on-board assembly comprising an application computer, characterized by the fact that the on-board assembly comprises a second application computer, and by the fact that these two computers are distinct and interchangeable and receive both the same data supplied by the human and/or terminal user interface and the same data supplied by an interface with the ground-air sub-network access processor or processors on the ground user side.

The present invention also relates to a procedure for surviving a failure comprising the use of a second application computer during failure of the application computer on board an aircraft in order to maintain a ground-air operational link, characterized by the fact that it comprises the following stages:
  real-time capture by the second computer of the data it requires to maintain digital communication links and application associations for operational dialog,
  real-time positioning of the application assembly and communication layer assembly programmable controllers,
  switching, when a failure occurs, from the first computer to the second while maintaining the virtual communication circuits established by the first computer before the failure occurred.

Maintenance by the system of the invention of continuity of communications services between the aircraft and the ground is made possible by using failure survival mechanisms that operate without delay and without any operational impact.

Looping mechanisms enable the two computers to effect real-time acquisition of all the data needed for them to establish and maintain an operational link with the ground, even after a failure.

The original feature of the invention is to enable the programmable controllers of the two application computers to configure in real time.

The invention therefore has the following advantages:

survival of a failure without interruption of the ground-air link, delay or operational impact, elimination of delays associated with reestablishing a digital ground-air link, improved system integrity due to the independent operation of the end systems, no modification to standardized OSI communication softwares is required.

The advantages of the invention are directly related to the improved uptime rate of the data link system in the aircraft. Examples may be given of examples of operational environments where system uptime results in:

Time saving; frequencies are congested in areas where there is a high concentration of voice traffic. For example, 20 minutes can easily be saved by the data link system when applying for departure clearance. The loss of the system to a failure completely disrupts the procedure and lengthens delays rather than reducing them.

Improved safety:

communication and surveillance applications of the data link system help separate aircraft in the air lanes. In this case the uptime of the data link system is a factor contributing to both operational efficiency and safety. The survival by the data link system of a failure maintains the risk of collision at the level defined for the applied separation; moreover, loss of the data link to a failure has effects on traffic management, pilot/ATC transactions: the loss of the data link system to a failure affects the level of safety if it occurs during a transaction (e.g. loss of the data link system while ATC is giving the pilot an instruction such as "CLIMB TO FL XXX".

Total integrity: it is an objective that there is total integrity of a transmitted message from one end of the system to the other. The survival of a failure by the data link system reinforces the meeting of this objective. The use of the data link system in areas such as the terminal area requires improved uptime performances that presuppose the capacity to survive a failure.

DISCLOSURE OF EMBODIMENTS

To survive failure of the functions of the on-board end system the data link system of the invention between an aircraft, for example an airplane, and the ground, comprises a second on-board end system that is designed to ensure the continuity of communication services between the aircraft and the ground.

The data exchange or "cross-talk" technique between the two end systems presents the following difficulties:

the data that the first end system acquires to operate must be transmitted to the second end system before commutation takes place, all the programmable controllers of the first end system interact with one another and adopt real-time positions according to the ground-air exchanges between the end users. The inputs/outputs of the respective programmable controllers located in the second end system must be downloaded so that they are prepositioned in the event of commutation occurring. However, this capacity to download required the development of specific software.

Figure 1:
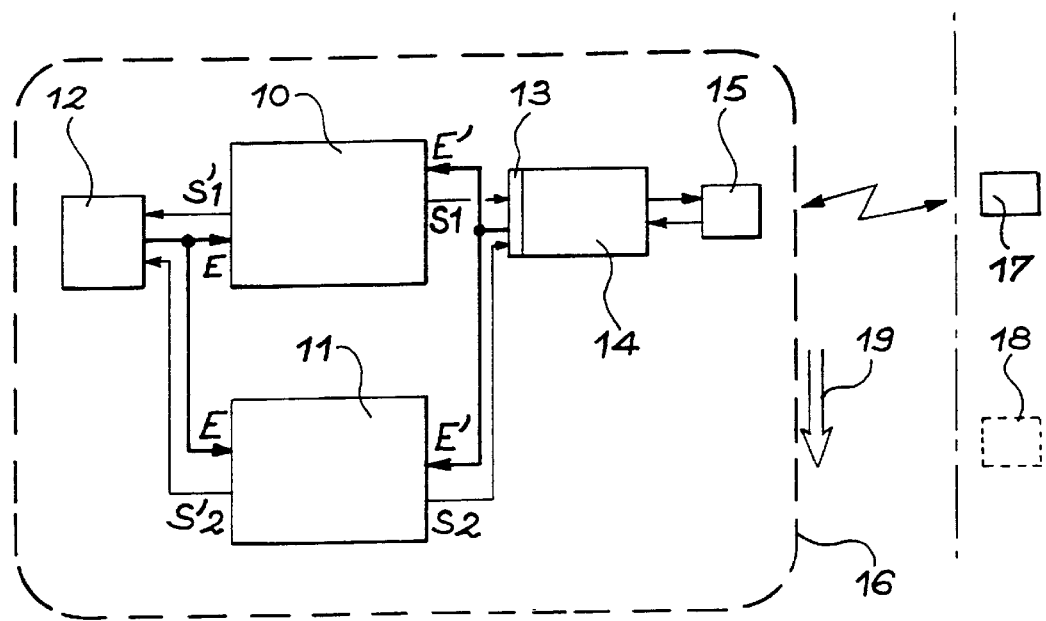
FIGS. 1, 2 and 3 illustrate the system of the invention.

As shown in FIG. 1, the invention consists of an architecture based on two end systems of distinct, interchangeable computers 10 and 11 that receive the same data both from on-board user interface 12 (man-machine interface) (E) and from interface 13 with the ground-air sub-network access computer or computers 14 on the ground user side (E'). FIG. 1 also shows on-board transmitter-receiver 15 and two remote terrestrial stations 17, 18. Dotted line 16 represents the aircraft and arrow 19 the direction of aircraft 16.

Computers 10 and 11 implement application and communication processes that provide the communication services required by the OSI model.

Computers 10 and 11 may communicate with one or more similar ground-based systems via one or more ground-air sub-network access processors (satellite, HF, VHF, S mode, gate link).

The data supplied by the human and/or terminal user interface 12 is transmitted to computers 10 and 11. Data units received from the ground by the ground-air sub-network access processor or processors are retransmitted to computers 10 and 11.

The first computer 10 transmits the data it generates to the ground. It is therefore this computer that initially creates the virtual communication circuit with the ground.

This type of architecture provides looping mechanisms that enable computers 10 and 11 to acquire the same data at the user interface and the sub-network. The programmable controllers of the second computer 11 therefore have inputs/outputs positioned in real time depending on the exchanges between the users located at the ends of the data link.

When a failure is detected in the first computer 10 it stops transmitting to the network and the second computer 11 transmits in its place. The virtual circuit established by first computer 10 is maintained by the second.

Data transmitted to the ground is sequenced at sub-network level.

Ground-air sub-network access processor 14 can discriminate between the first and second computers 10 and 11 by means of their respective addresses and by decoding the data that each provides regarding its status.

Figure 2:
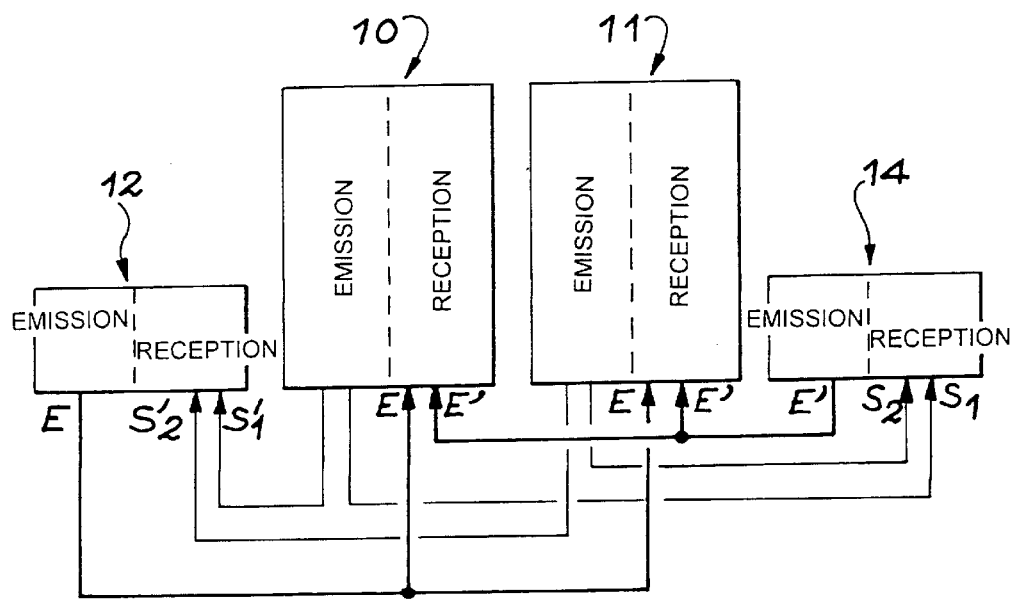

FIG. 2 shows the two computers 10 and 11, user interface 12 and ground-air sub-network access processor 14, the transmission and reception section of each being shown to illustrate the flow of data.

Figure 3:
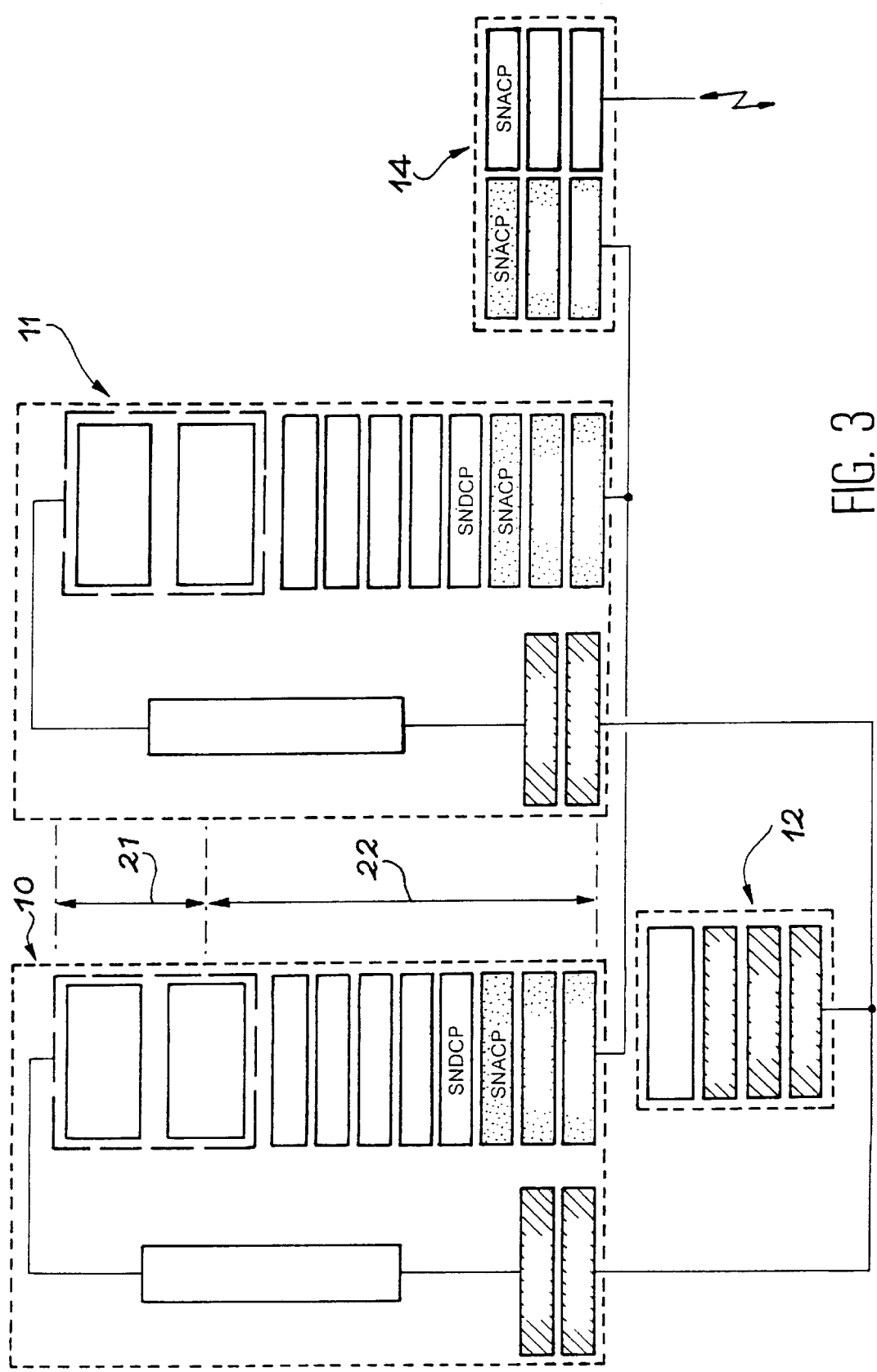

FIG. 3 also shows the system of the invention but in this case including a representation of the different OSI communication levels 22 and on-board application levels 21.

The three lowest layers (shaded) depend on the type of ground-air network used. The application assemblies are the sections of use to the user.

Bridges are used to adapt messages according to the user terminal installed.

Since there is no synchronization mechanism between the programmable controllers of computers 10 and 11, the programmable controllers may configure directly in real time. When a failure occurs, the switchover from the first computer 10 to the second 11 is achieved while maintaining the virtual communication circuits established by the first computer 10 before the failure.

Figure 4:
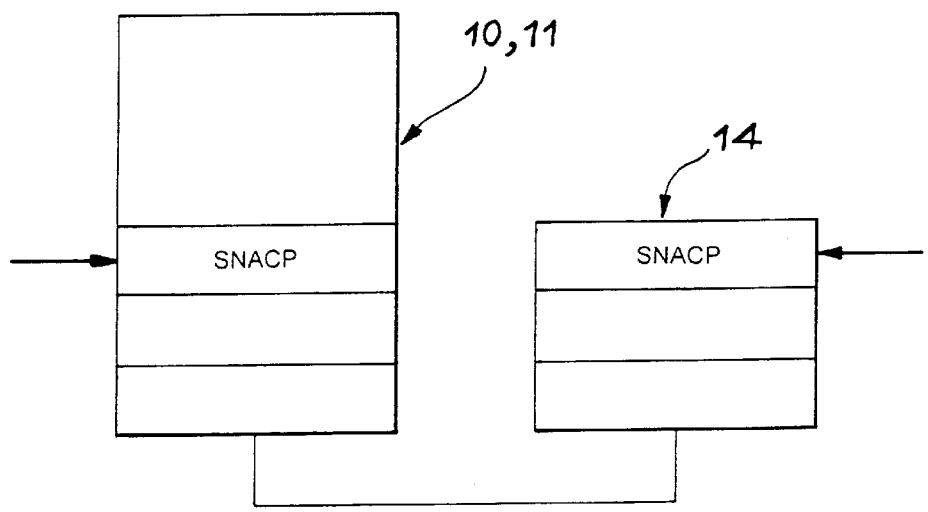
FIGS. 4 and 5 show the operation of the system.

FIG. 4 shows the link and SNACP layers of the first or second computer 10, 11 and those of the ground-air sub-network access processor 14.

It can be imagined that at a given moment the signals generated by the two end processors 10 and 11 may be different due to different computing times.

Figure 5:
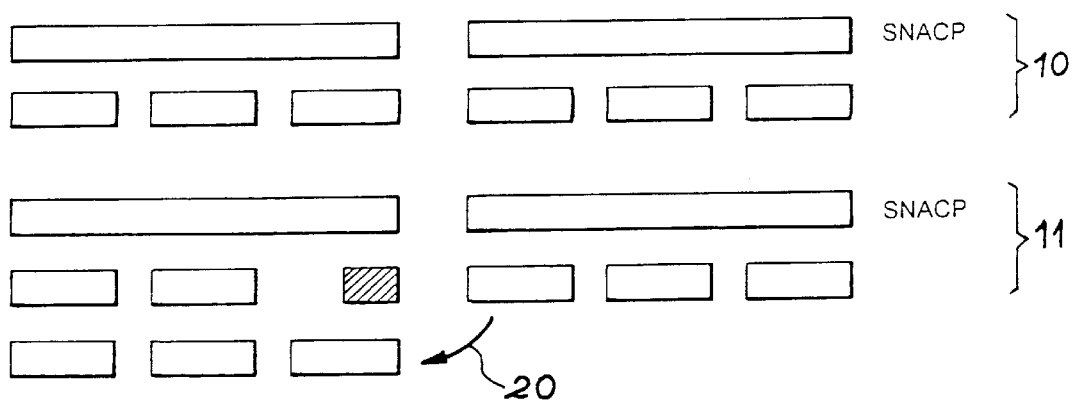

The SNACP layer exchanges a data packet and the link layer three frames. As shown in FIG. 5 there may be a difference in the number of bits in the third frame (shaded).

When switching from the first to the second computer occurs, the difference (lack of several bits in the case shown) is detected and request for retransmission of the frames until coherence (20) is achieved. There is thus an error correction procedure.

The procedure of the invention of switching from first computer 10 to second computer 11 comprises the following steps:

real-time acquisition by the second computer 11 of the data it requires to maintain digital communication links and application associations for operational dialog, real-time positioning of the application assembly and communication layer assembly programmable controllers, switching, when a failure occurs, from the first computer to the second 11 while maintaining the virtual communication circuits established by the first computer 10 before the failure occurred.

The invention is embodied by installing the second computer in an aircraft. The nature of the data exchanged is described as follows: application or operational data used by the application entities and communication data used by the communication entities. No operational scenario in which all the data is implemented has been described because these transfers do not appear in the description, being transparent to the end system users.

REFERENCES

[1] ACARS, Aircraft Communication Addressing Report System (SDN; A340/A330; ATA23-24; Apr. 8, 1994).

[2] Aircom SITA Digital Ground-air Service System Specification ("Société Internationale de Telecommunications Aeronautiques"—International Society for Aviation Telecommunications; EG/400; revision 2, April 1992).

[3] Part One/InternetWorking (Radio Technical Commission for Aeronautics, SC-162; D0-205; Mar. 21, 1990).

[4] ARINC Characteristic 758 (Draft 4; page 25, Jun. 25, 1996.

FIGURES
FIG. 2
Emission=Transmission
Réception=Reception
FIG. 3
Passerelle=Bridge
Liaison physique=Physical link
Process. utilisateur=User processor
Application=Application
Presentation=Presentation
Session=Session
Transport=Transport
Inter-reseau=Internetwork
SNDCP=SNDCP
SNACP=SNACP
Interface utilisateur=User interface
Station terrestre=Ground station
FIG. 4
SNACP=SNACP
Liaison=Link
FIG. 5
SNACP=SNACP
Liaison=Link

What is claimed is:

1. Data link system between an aircraft and at least one land-based station comprising an on-board assembly, a ground-air assembly and a land-based assembly, the last two assemblies being composed of sub-networks interconnected by routers and acting as the medium for distributed applications, the on-board assembly comprising a first interface with at least one ground-air sub-network access computer using an on-board transmitter-receiver, a first application computer and a second user interface wherein said on-board assembly comprises a second application computer that receives the same data as the first computer transmitted by the first interface and the second interface.

2. A method for maintaining continuity of communication services between an aircraft and ground, wherein said aircraft includes an on-board assembly having a first on-board application computer and a second on-board application computer, said first and said second on-board computers receiving the same data from an interface with at least one ground-air sub-network access computer on a ground user side, and said first and said second on-board computers receiving the same data from an interface with an on-board user, said method providing said second on-board application computer when a failure is detected in said first on-board application computer, said method essentially comprising the steps of:

real-time acquisition by said second computer of data it requires to maintain digital communication links and application associations from operation dialog;

real-time positioning of the application assembly and communication layer assembly programmable controllers;

switching, when a failure occurs, from the first computer to the second computer while maintaining the virtual communication circuits established by the first computer before the failure occurred.

* * * * *